Figure 1:
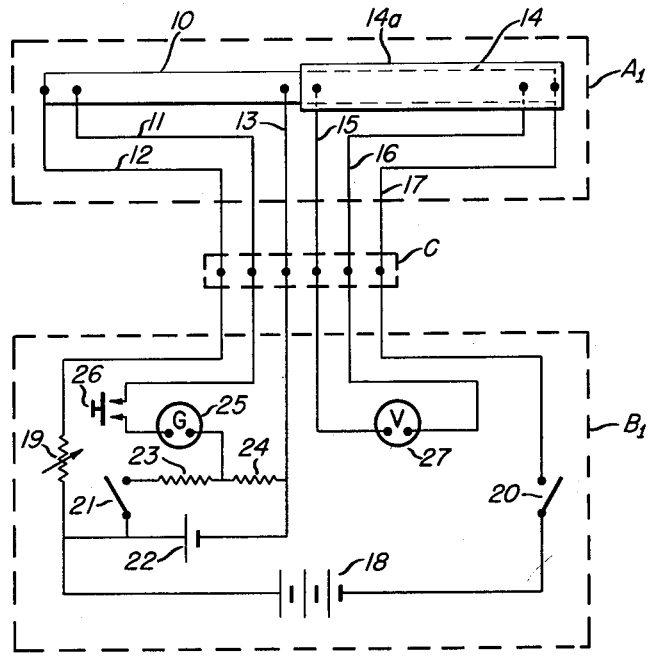

Dec. 4, 1962 A. J. FREEDMAN 3,067,386
AUTOMATICALLY TEMPERATURE-COMPENSATED CORROSION MEASUREMENTS
Filed Aug. 29, 1958 3 Sheets-Sheet 1

INVENTOR.
Arthur J. Freedman
BY
William J. Birmingham
ATTORNEY

United States Patent Office 3,067,386
Patented Dec. 4, 1962

3,067,386
AUTOMATICALLY TEMPERATURE-COMPENSATED CORROSION MEASUREMENTS
Arthur J. Freedman, Chicago Heights, Ill., assignor to Standard Oil Company, Chicago, Ill., a corporation of Indiana
Filed Aug. 29, 1958, Ser. No. 758,088
18 Claims. (Cl. 324—71)

This invention relates to a method and apparatus for determining and/or measuring corrosion. More specifically, the invention relates to a simplified and flexible electrical apparatus for accurately measuring corrosion of metals, which apparatus is automatically temperature compensated, does not employ bridge networks for corrosion measurements, and lends itself to portable design.

At the present time there are various types of electrical apparatus on the commercial market for measuring corrosion, which term is used herein to include erosion. It has been found, however, that such devices suffer from one or more shortcomings. With some available devices, for example, corrosion is determined by measuring the electrical resistance of specimens by means of bridge networks, e.g., Wheatstone or Kelvin bridges, which bridge networks are limited in flexibility of application and provide resistance readings which are non-linear with respect to corrosion. With other available devices, compensation for changes in temperature is non-automatic; and calculations, chart interpretations and/or the like must be resorted to after a reading has also been taken with a reference specimen, a temperature indicator, e.g., a thermocouple, and/or the like. Still other commercial devices include the resistance of the leads, i.e., electrical conductors, between the specimens and the measuring apparatus itself when determining resistance, thereby introducing an additional source of error. Still other shortcomings include undue complexity, lack of portability, and the like.

It is an object of the present invention to provide an accurate apparatus for determining corrosion and erosion, which is free of the above shortcomings, e.g., does not employ bridge networks and is automatically temperature-compensated. Other objects of the present invention will become apparent as the detailed description thereof proceeds. A further object is to provide a system for determining corrosion and erosion wherein the resistance readings are linear with respect to such corrosion or erosion.

I attain the objects of my invention by providing an instrument which comprises in combination a probe for holding a metallic, corrosion-sensitive, electrical resistance element, hereinafter termed the corrosion specimen and a corrosion-insensitive electrical resistance element, hereinafter termed the reference specimen, electrically connected in series with said corrosion specimen, the electrical resistance characteristics of said reference specimen and said corrosion specimen being substantially identical at least with respect to response to changes in temperature; a first circuit including an adjustable electric current source for passing current through both specimens in series, whereby current may be adjusted so as to produce a selected constant voltage drop across the corrosion specimen; a second circuit for sensing the selected constant voltage drop across the corrosion specimen; and a voltage indicator across the reference specimen to indicate voltage changes which in turn give an indication of the extent of corrosion of the corrosion specimen. Since temperature-induced changes in resistance of the corrosion specimen are automatically compensated for by measuring voltage changes across the reference specimen, which is subject to the same temperature conditions, no further corrections and/or calculations are necessary.

In the apparatus as above described, the reference specimen is conveniently made of the same material as the corrosion specimen and is rendered insensitive to corrosion (i.e., the amount of corrosion, if any, does not significantly change the resistance) by means of a noncorrodible or corrosion-resistant coating, such as hereinafter described, and/or by making the reference specimen very much thicker than the corrosion specimen. Customarily, the reference specimen and the corrosion specimen are made from one continuous strip, tube, or wire of metal, to which electrical conductors are attached at appropriate points and the non-corrodible or corrosion-resistant coating applied to that portion which is to be employed as the reference specimen. The reference and corrosion specimens need not be of equal lengths, or in a fixed ratio of lengths, as is required when employing Wheatstone and Kelvin bridge networks in the apparatus.

The adjustable electric current source of the first circuit for passing current through the corrosion and reference specimens in series may conveniently comprise an ordinary battery and a variable resistor in series with the battery. The variable resistor may typically be a series of variable resistors of graduated ranges so as to permit both coarse resistance (and current) adjustments and increasingly-finer resistance (and current) adjustments.

The second circuit for sensing the selected constant voltage drop across the corrosion specimen may comprise a source of constant voltage and a current sensing means, e.g., a galvanometer, electrically connected so as to receive in series at least a fixed portion of said constant voltage, said fixed portion and said galvanometer in series being electrically connected in parallel with said corrosion specimen. The voltage drop across the corrosion specimen is the same as said portion of said constant voltage when a null reading, i.e., a no-current reading, is indicated on the current sensing means. The selected constant voltage drop may be any arbitrary value, usually selected as a matter of design convenience. The arbitrary value must, of course, be the same for comparative readings on the same corrosion specimen. Typically, the apparatus is designed with a choice of one or more selected constant voltage drops, which provide a wide degree of flexibility.

The voltage indicator across the reference specimen may conveniently be a voltmeter. The voltmeter may read directly in volts or subdivisions thereof and relative corrosion determined by differences in voltage readings. Since the voltage drop across the reference specimen is directly proportional to the thickness of metal remaining on the corrosion specimen, the face of the voltmeter can conveniently be calibrated so as to read directly in arbitrary corrosion units, units of specimen thickness, depth of penetration, or the like. Alternatively, in a particular embodiment, the voltage drop across the reference specimen may be determined by the very accurate "null technique." This is conveniently carried out by employing a source of constant voltage, a calibrated variable voltage divider whereby a portion of said constant voltage may be selected, and a current indicator, e.g., a galvanometer, electrically connected to said voltage divider so as to receive in series the selected portion of said constant voltage. The selected portion is made the same as the voltage drop across the reference specimen by adjustment of the voltage divider. Voltages are the same when a "no-current" reading, that is, a null, is obtained on the galvanometer. Typically, the variable voltage divider is calibrataed directly in arbitrary corrosion units, or the like. In a preferred embodiment, the constant voltage source and the galvanometer may be the same as those employed in the second circuit for sensing the selected constant voltage drop across the corrosion specimen.

This may be accomplished simply by conventional electric switches.

Further details of the invention and specific examples thereof will become apparent as the following description proceeds in conjunction with the drawings wherein:

FIGURE 1 is a schematic illustration of a simple embodiment of the apparatus.

Figure 2:
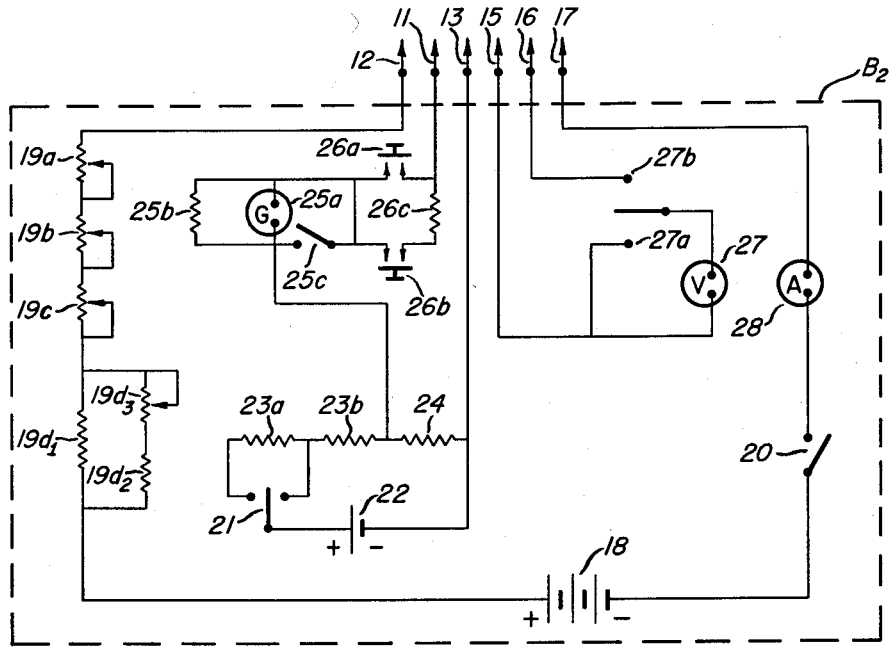
Figure 3:
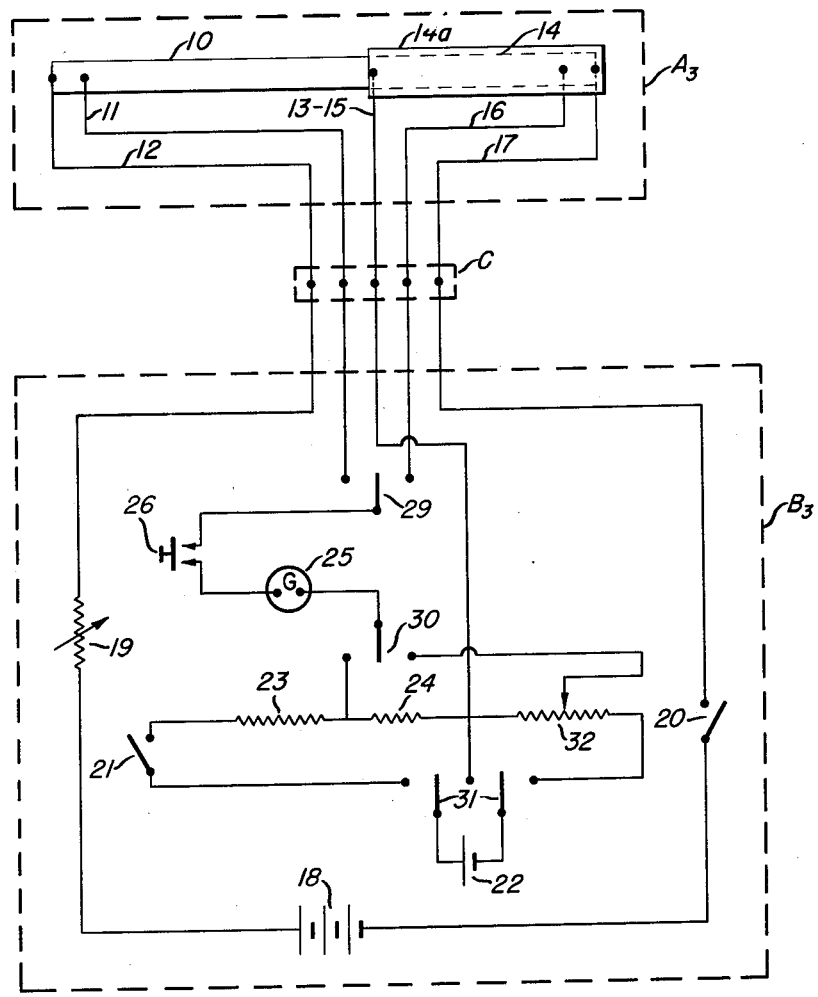
Figure 4:
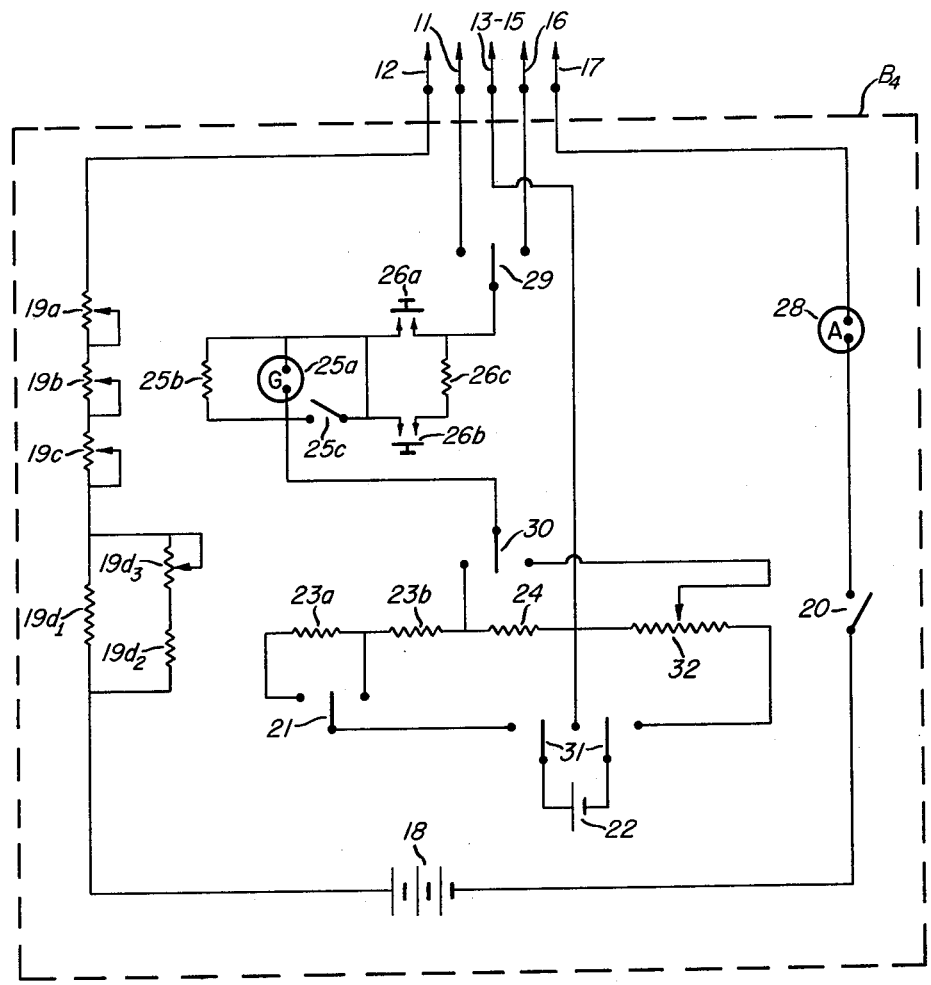

FIGURE 2 presents amplifying details of a portion of the embodiment shown in FIGURE 1;

FIGURE 3 is a schematic illustration of another embodiment wherein the "null technique" is employed; and FIGURE 4 presents additional details of a portion of the embodiment shown in FIGURE 3.

Referring to FIGURE 1, the apparatus of the present invention comprises probe $A_1$ and corrosion indicator $B_1$, optionally with plug and socket C whereby electrical conductors from the probe may be disconnected from the corrosion indicator when corrosion measurements are not being made and whereby extension cables may be inserted to permit operation from remote locations.

When making corrosion measurements, the probe is normally inserted into the corrosive medium; and the corrosion indicator may typically be located at a convenient observation point. So that the corrosion indicator may be used in connection with a plurality of probes at different locations, plug and socket C facilitates a quick and convenient means for disconnecting the probe from the corrosion indicator. Typically, the corrosion indicator is contained in a portable case which can be carried from one location to another. Alternatively, a plurality of probes may be located at various locations with electrical conductors leading to a central point, e.g., a control room, wherein the corrosion indicator is located. In this embodiment, the plug and socket may include or may comprise a multi-gang, multi-position switch. Thus, the corrosion indicator may be connected to any particular probe merely by appropriately positioning the switch.

The probe contains an elongated metallic, corrosion-sensitive, electrical resistance element 10, also termed the corrosion specimen. Electrical conductors 11 and 12 are attached adjacent to one extremity of the corrosion specimen, and electrical conductor 13 is attached to the other extremity thereof. The probe also contains an elongated, metallic, corrosion-insensitive, electrical resistance element 14, also termed the reference specimen, which is electrically connected in series with corrosion specimen 10. In FIGURE 1, corrosion specimen 10 and reference specimen 14 comprise a single continuous metallic strip. In other embodiments, not shown, metallic tubes, wires, and/or the like may be used for the corrosion and/or reference specimens. The electrical resistance characteristics of reference specimen 14 are thus identical (for a given cross section and length) to those of corrosion specimen 10. Reference specimen 14 has a fourth electrical conductor 15 attached adjacent to the extremity of reference specimen 14 which borders on corrosion specimen 10. Reference specimen 14 also has a fifth electrical conductor 16 and a sixth electrical conductor 17 attached adjacent to its other extremity.

Reference specimen 14 is rendered corrosion insensitive by means of a non-corrodible or corrosion-resistant protective coating, which in FIGURE 1 is represented by 14a. This coating may be of any material which is not susceptible or sensitive to the corrosive or erosive action of the medium causing corrosion or erosion. The coating, for example, may be composed of rubber or a plastic material, such as an epoxy resin, Teflon (a polymer of tetrafluoroethylene), Kel-F (a polymer of trifluorochloroethylene), or the like. It may also be composed of a ceramic material such as glass, cement or the like. The particular coating selected is dependent on the medium against which protection is sought. The coating may be applied in any suitable manner, such as painting, spraying, dipping, heat-sealing sheets of the protective coating to produce a "sandwich" effect, or the like. If the lead wires which are attached to the corrosion specimen and reference specimen are corrosion susceptible, these lead wires should also be coated. When a continuous metallic piece is used for both the corrosion specimen and reference specimen, as in FIGURE 1, protective coating 14a of reference specimen 14 may be terminated between electrical conductors 13 and 15, the exact point of termination between the conductors not being critical.

To obtain a substantially linear response to corrosion when the corrosion and reference specimens are made in the form of strips, the width of the strips is normally many times the thickness, for example, at least ten times the thickness so that the area of the edges is negligible compared to the area of the faces of the specimens. Thus, the electrical conductivity of corrosion specimen 10 is a substantially linear function of its thickness. Corrosion specimen 10 (and reference specimen 14) may also have other cross-sectional configurations, e.g., circular as in wire, or doughnut-shape as in a tube. Such other shapes are usually preferred in applications where mechanical strength of the specimen is desired, as in field applications. Very thin, e.g., 1 mil (.001 in.) strip specimens are desired for laboratory use where high sensitivity is needed. In a typical laboratory installation the corrosion specimen may have a length of about 2 inches and the reference specimen a length of about 1¼ inches. The width may be about ⅛ inch and the thickness, as aforementioned, about 1 mil. The resistance of the specimens, e.g., carbon-steel corrosion and reference specimens, may approximate about $10^{-2}$ to $10^{-4}$ ohms.

In the normal operation of the apparatus a current is applied through corrosion specimen 10 and reference specimen 14 (when switch 20 is closed) by means of potential source 18, e.g., an ordinary battery, and variable resistor 19. The resistance of resistor 19 is adjusted so that the voltage drop across corrosion specimen 10 between leads 11 and 13 is exactly equal to the voltage drop across resistor 24, said latter voltage drop being a portion of the potential of constant voltage source 22, which appears across constant-resistance resistors 23 and 24 when switch 21 is closed. This condition obtains when sensitive galvanometer 25 shows a no-current or null reading when galvanometer key 26 is closed. When variable resistor 19 has been accordingly adjusted, a reading is taken on voltmeter 27, which measures the voltage drop across the reference specimen 14 between the points where leads 15 and 16 are attached. Comparative voltage readings on voltmeter 27 provide a temperature-compensated measure of the corrosion of the corrosion specimen 10, as hereinafter discussed.

As corrosion of corrosion specimen 10 proceeds with passage of time, its thickness decreases and thus resistance increases. To obtain the same voltage drop across corrosion specimen 10 which now has a higher resistance, resistor 19 is adjusted so as to decrease the current flow and thereby restore the balance of voltages as indicated by a null reading on galvanometer 25. The resulting decreased current through reference specimen 14 reduces the voltage drop across the specimen and thus the voltage reading on voltmeter 27. By measuring the voltage drop across reference specimen 14, which is subjected to the same temperature conditions as corrosion specimen 10, temperature-induced changes in resistance of corrosion specimen 10 are automatically compensated for. For convenience, voltmeter 27 is usually calibrated to read directly in terms of arbitrary corrosion units, thickness of corrosion specimen, depth of penetration, or the like.

FIGURE 2 shows the corrosion indicator in further detail, that is, $B_2$ is the same as $B_1$ of FIGURE 1 except for additional current details. Accordingly, the variable resistance for adjusting current flow through the corrosion specimen and reference specimen comprises a series of variable resistors 19a, 19b, 19c, and 19d (resistor 19d comprising fixed resistors $19d_1$ and $19d_2$ and variable resistor $19d_3$) of progressively decreasing resistance, which permit coarse and fine adjustments. For example, resistor $19a$ may have a range of 0–250 ohms; resistor $19b$ may have a range of 0–15 ohms; resistor $19c$ may have a range of 0–1 ohm; resistors $19d_1$ and $19d_2$ may each have a fixed resistance of 1 ohm and $19d_3$ may have a range of 0–1 ohm. Battery source 18 may comprise three mercury "A" batteries in series, such as the low-voltage (1.34 volts), high-current mercury cells available commercially. Ammeter 28, e.g., 0–5 or 0–10 amp. ammeter, is usually inserted in the circuit merely to show current flow and thus to check operation.

The galvanometer circuit may include galvanometer key 26a, which serves the same purpose as key 26 in FIGURE 1, and safety key 26b in series with safety resistor 26c, e.g., a 10,000 ohm resistor. Safety key 26b and resistor 26c are used to check the circuit prior to pushing galvanometer key 26a, thus protecting galvanometer 25a in the event of a short circuit in the probe, leads or the like. Galvanometer 25a may typically be a highly-sensitive, portable-type, low-resistance galvanometer of commerce with an external critical resistance 25b of about 12 ohms and resistance of the moveable coil of about 3.5 ohms. Switch 25c is provided for "zeroing" the galvanometer.

The source of constant voltage in FIGURE 2 comprises a constant voltage battery 22, e.g., a 1.34 volt mercury "A" battery and resistors 23a, 23b, and 24. The left-hand position of switch 21 is the low-current position, and the right-hand position is the high-current position, the particular position being determined by the desired voltage drop across resistor 24. While only two positions for switch 21 and two resistors 23a and 23b, are shown in FIGURE 2, it is to be understood, of course, that a multi-position switch and multiple resistors may be employed to permit a wider choice of currents and thus selected voltage drops across resistor 24, thereby providing greater flexibility. In FIGURE 2, resistor 23a may have a value of 4,880 ohms; resistor 23b, 3,240 ohms; and resistor 24, 12.5 ohms.

Voltmeter 27, which may typically have a range of about 0 to 10 millivolts, but may actually read in arbitrary corrosion units, is typically supplied with a two-position switch 27a and 27b. Position 27a is employed for "zeroing" the voltmeter and for protecting the meter in portable applications when the instrument is not in operation. Position 27b is the position employed for taking corrosion readings.

Referring to FIGURE 3, probe $A_3$ is similar to $A_1$ of FIGURE 1 except that leads 13 and 15 of FIGURE 1 have been combined into a single common lead 13—15 in FIGURE 3 so as to form a "five-wire" system. Such combining of leads 13 and 15 in FIGURE 3 is possible (but not necessary) because of the "null technique" employed when taking corrosion readings with corrosion indicator $B_3$, as discussed hereinafter. It should be understood, however, that leads 13 and 15 in probe $A_1$ of FIGURE 1 could also be combined into a single common lead for at least a substantial portion thereof, provided that voltmeter 27 of FIGURE 1 has a very-high input resistance, such as is characteristic of a vacuum-tube voltmeter. Thus, to avoid any substantial error in the readings when combining leads 13 and 15 in FIGURE 1, the input resistance of voltmeter 17 should, for example, be about 11 megohms, as is characteristic of commercial vacuum tube voltmeters. The high input resistance minimizes current drawn by voltmeter 27 and thus the error in the corrosion reading associated therewith.

When leads 13 and 15 are not combined, i.e., a "six-wire" circuit is employed, the input resistance of voltmeter 27 may be relatively small because current drawn by it does not affect relative corrosion readings. Thus, an inexpensive voltmeter may be employed. The decision as to whether a "five-wire" system with a very-high resistance voltmeter or a "six-wire" system with an inexpensive voltmeter is to be employed is a matter of choice dictated by economy of construction and design convenience. The "six-wire" system with an inexpensive voltmeter is normally preferred with the embodiment shown in FIGURES 1 and 2. In the case of indicator $B_3$ of FIGURE 3, however, either the "five-wire" or the "six-wire" system may be used because the null technique employed eliminates current flow. Thus, no errors are introduced.

With a "five-wire" system the protective coating 14a on reference specimen 14 must be more-carefully applied than in the case of a "six-wire" system wherein the protective coating may be terminated at any point intermediate leads 13 and 15. In the "five-wire" system the coating should cover the point at which common lead 13—15 is attached, but it should not cover any significant portion of the corrosion specimen, e.g., less than 1 percent of the corrosion specimen. If a significant portion of the corrosion specimen were to be coated, an appreciable error in corrosion readings would result. When the leads between the probe and corrosion indicator are short and the resistances thereof are relatively negligible as compared with resistances of the specimens, leads 11 and 12 and/or leads 16 and 17 can also be combined and thereby achieve simplified "three-wire" and/or "four-wire" systems as well as "five-wire" and "six-wire" systems.

Referring to corrosion indicator $B_3$ of FIGURE 3, it is apparent that instead of employing a voltmeter for corrosion readings, a null-balance circuit is substituted. In the "null technique" a portion of a constant voltage is selected by means of a slide-wire circuit, which portion is adjusted to exactly equal the voltage drop across the reference specimen. The null point is indicated by a no-current reading on a sensitive current indicator, e.g., a galvanometer, which is in series with the selected portion of the constant voltage, the galvanometer and the selected portion of constant voltage being connected in parallel with the reference specimen.

In corrosion indicator means $B_3$ of FIGURE 3 the same current indicator, i.e., galvanometer 25, and the same constant voltage source, i.e., battery 22, are employed for both sensing the selected constant voltage drop across corrosion specimen 19 (switches 29, 30, and 31 being in the left-hand position) and measuring the voltage drop across reference specimen 14 (switches 29, 30, and 31 being in the right-hand position). When switches 29, 30, and 31 are in the left-hand position (switches 20 and 21 being closed) resistance 19 is adjusted until a null reading is obtained on galvanometer 25 when key 26 is closed. Switches 29, 30, and 31 are then placed in the right-hand position, and the slide wire of calibrated voltage divider 32 is adjusted until a null reading is also obtained on galvanometer 25 when key 26 is closed. The slide wire of calibrated voltage divider 32 may preferably read directly in terms of arbitrary corrosion units, units of thickness of the speciment, depth of corrosion, or the like.

FIGURE 4 presents a more detailed description of corrosion indicator $B_3$ of FIGURE 3. The components of corrosion indicator $B_4$ of FIGURE 4, which have the same identifying numbers as in corrosion indicator $B_3$ of FIGURE 2, serve the same function and may have the same values as described in connection with FIGURE 2. Switches 25c, 29, 30, and 31 may be combined into a single conventional multi-gang, multi-position, instrument-type rotary switch, or its equivalent. Calibrated voltage divider 32 may be a 10,000 ohm, ten-turn voltage divided with at least about 0.1 percent accuracy or better, such as may be selected from an appropriate commercial equipment catalog. As aforementioned, the voltage divider can be calibrated to read directly in the desired units of corrosion.

As is obvious from the circuit diagrams of FIGURES 3 and 4, the direction of needle deflection of galvanometer 25 would be reversed (except at the null point) when switches 29, 30, and 31 are turned from left to right, or vice versa. If desired, the same direction of deflection could be obtained by alternative circuitry obvious to one skilled in the art, which alternative circuitry should be considered within the spirit of the present invention. In similar fashion, alternative circuitry can readily be substituted for constant voltage source 22. For example, instead of a constant-voltage mercury cell, a common dry cell coulde be employed with provision for standardization against a standard cell by the conventional procedures such as used in connection with commercial potentiometers.

From the above description it is apparent that the objects of the present invention have been attained. The apparatus does not employ bridge networks and thus does not have the shortcoming inherent therein. The response of the apparatus to corrosion is substantially linear and the apparatus automatically compensates for changes in temperature. Readings may be taken directly in terms of the desired units without calculations, chart interpretations, or the like. With certain embodiments, the probe may be located, if desired, at a substantial distance from the corrosion indicator without introduction of errors.

The apparatus is simple, inexpensive, and lends itself to portability of design.

The invention has, of course, been described in terms of specific examples set forth in considerable detail. However, it should be understood that these are by way of illustration only and that the invention is not limited thereto. Alternative embodiments and operating techniques will become apparent to those skilled in the art in view of my disclosure; and, accordingly, modifications of my invention are contemplated without departing from the spirit of the described invention or from the scope of the appended claims.

Having thus described the invention, what is claimed is:

1. A temperature-compensated instrument for measuring corrosion which comprises two electrical resistance specimens of which one is a corrosion specimen and another is a corrosion-insensitive reference specimen having the same electrical resistance characteristics as said corrosion specimen at least with respect to response to changes in temperature; a first electrical series circuit including an adjustable current source for passing current through said corrosion specimen and said reference specimen in series, whereby current may be adjusted so as to produce a selected voltage drop across said corrosion specimen; a second circuit connected across said corrosion specimen for sensing said selected voltage drop across said corrosion specimen; and a voltage indicator means connected across said reference specimen to indicate voltage changes across said reference specimen which in turn give a temperature-compensated indication of the extent of corrosion of said corrosion specimen.

2. The instrument of claim 1 wherein said reference specimen is made of the same material as said corrosion specimen and is rendered corrosion insensitive by means of a non-corrodible protective coating.

3. The instrument of claim 1 wherein said current source of said first circuit comprises a source of voltage and a variable resistance in series therewith.

4. The instrument of claim 1 wherein said second circuit comprises a source of constant voltage and a galvanometer electrically connected so as to receive in series at least a portion of said constant voltage, said portion and said galvanometer in series being electrically connected in parallel with said corrosion specimen.

5. The instrument of claim 1 wherein said voltage indicator is a voltmeter.

6. The instrument of claim 1 wherein said voltage indicator comprises a source of constant voltage, a calibrated variable voltage divider across said source whereby a portion of said constant voltage may be selected, a galvanometer electrically connected to said voltage divider so as to receive in series the selected portion of said constant voltage, said galvanometer and said selected portion in series being electrically connected in parallel with said reference specimen.

7. The instrument of claim 1 wherein said second circuit comprises a first source of constant voltage and a first galvanometer electrically connected to said first source of constant voltage so as to receive in series at least a portion of said constant voltage, said portion and said first galvanometer in series being electrically connected in parallel with said corrosion specimen, and wherein said voltage indicator comprises a second source of constant voltage, a calibrated variable voltage divider across said second source whereby a portion of said second source of constant voltage may be selected, a second galvanometer electrically connected to said voltage divider so as to receive in series the selected portion of said second constant voltage source, said selected portion and said second galvanometer in series being electrically connected in parallel with said reference specimen; and switch means connected in said second circuit and said voltage indicator whereby a single source of constant voltage may be employed interchangeably as said first and said second source of constant voltage and a single galvanometer may be employed interchangeably as said first and said second galvanometer.

8. An automatically-temperature-compensated, corrosion-measuring, electrical apparatus which comprises in combination a probe comprising an elongated metallic, corrosion-sensitive, electrical resistance element, hereinafter termed the corrosion specimen, said corrosion specimen having a first and a second electrical conductor attached adjacent to one extremity thereof and a third electrical conductor attached adjacent to the other extremity thereof, an elongated, corrosion-insensitive electrical resistance element, hereinafter termed the reference specimen, one extremity of said reference specimen being in electrical series with one extremity of said corrosion specimen, the electrical resistance characteristics of said reference specimen and said corrosion specimen being substantially identical at least with respect to response to changes in temperature, said reference specimen having a fourth electrical conductor attached to said reference specimen and adjacent to the extremity of said reference specimen which is connected to said corrosion specimen, and a fifth and a sixth electrical conductor attached adjacent to the other extremity of said reference specimen; and a corrosion indicator comprising a current-indicator and a first constant voltage source in series therewith, said current indicator and said first constant voltage source being connected in parallel with said corrosion specimen by said second and third electrical conductors, a voltage indicator for measuring voltage drop across said reference specimen, said voltage indicator being connected in parallel with said reference specimen by said fourth and fifth electrical conductors, a variable resistance and a second voltage source connected in series therewith, said variable resistance and second voltage source being connected in parallel with said corrosion specimen and said reference specimen by means of said first and said sixth electrical conductors, the polarity and potential of said voltage source being such as to permit a no-current reading on said current-indicator by adjustment of said variable resistance, whereby changes in the voltage drop across said reference specimen when said current indicator indicates a no-current reading provide a measure of the corrosion of the corrosion specimen.

9. The apparatus of claim 8 wherein said reference specimen is made of the same material as said corrosion specimen and is rendered corrosion-insensitive by means of a corrosion-resistant protective coating.

10. The apparatus of claim 8 wherein said first constant voltage source comprises a third electrical resistance element in parallel with a fourth electrical resistance element and a constant-voltage cell, said fourth electrical resistance element and said constant voltage cell being electrically connected in series.

11. The apparatus of claim 8 wherein said current indicator is a galvanometer.

12. The apparatus of claim 8 wherein said voltage indicator is a voltmeter.

13. The apparatus of claim 8 wherein said voltage indicator comprises a source of constant voltage, a calibrated, variable voltage divider across said source whereby a portion of said constant voltage may be selected, a galvanometer electrically connected to said voltage divider so as to receive in series the selected portion of said constant voltage, said selected portion and said galvanometer in series being electrically connected in parallel with said reference specimen.

14. The apparatus of claim 8 including a separable plug and socket, said plug and socket being inserted in said electrical conductors intermediate said probe and said corrosion indicator such that said probe and said corrosion indicator may be electrically separated when corrosion measurements are not being made.

15. The apparatus of claim 8 wherein said third and said fourth electrical conductors comprise a single common electrical conductor for at least a substantial portion of the length of each and said voltage indicator is a vacuum-tube voltmeter.

16. The apparatus of claim 8 wherein said first and said second electrical conductors comprise a single common electrical conductor for at least a substantial portion of the length of each and said fifth and said sixth electrical conductor comprise a single common electrical conductor for at least a substantial portion of the length of each.

17. The apparatus of claim 10 wherein said third and said fourth electrical conductors comprise a single common electrical conductor for at least a substantial portion of the length of each.

18. The method of measuring corrosion which comprises exposing two electrical resistance specimens to a corrosive atmosphere, one of said specimens being a corrosion specimen and the other being a corrosion-insensitive reference specimen having the same electrical resistance characteristics as said corrosion specimen at least with respect to response to changes in temperature; passing an electrical current through said corrosion specimen and said corrosion-insensitive reference specimen in series; adjusting said current so as to produce a selected voltage drop across said corrosion specimen; and detecting the voltage drop across said corrosion-insensitive reference specimen produced by said adjustment as a temperature-compensated indication of the extent of the corrosion of said corrosion specimen.

References Cited in the file of this patent

UNITED STATES PATENTS

| | | |
|---|---|---|
| 2,463,384 | Holmqvist | Mar. 1, 1949 |
| 2,735,754 | Dravnieks | Feb. 21, 1956 |

FOREIGN PATENTS

| | | |
|---|---|---|
| 693,276 | Germany | July 5, 1940 |
| 673,738 | Great Britain | May 24, 1950 |

OTHER REFERENCES

Stormont: "Corrosion Rates Directly Measured," The Oil and Gas Journal, volume 55, No. 3, January 21, 1957; pages 85–87.